C. BUTTERS.
PRECIPITATION OF METALS FROM CYANID SOLUTIONS.
APPLICATION FILED MAR. 31, 1913.
1,092,765.
Patented Apr. 7, 1914.
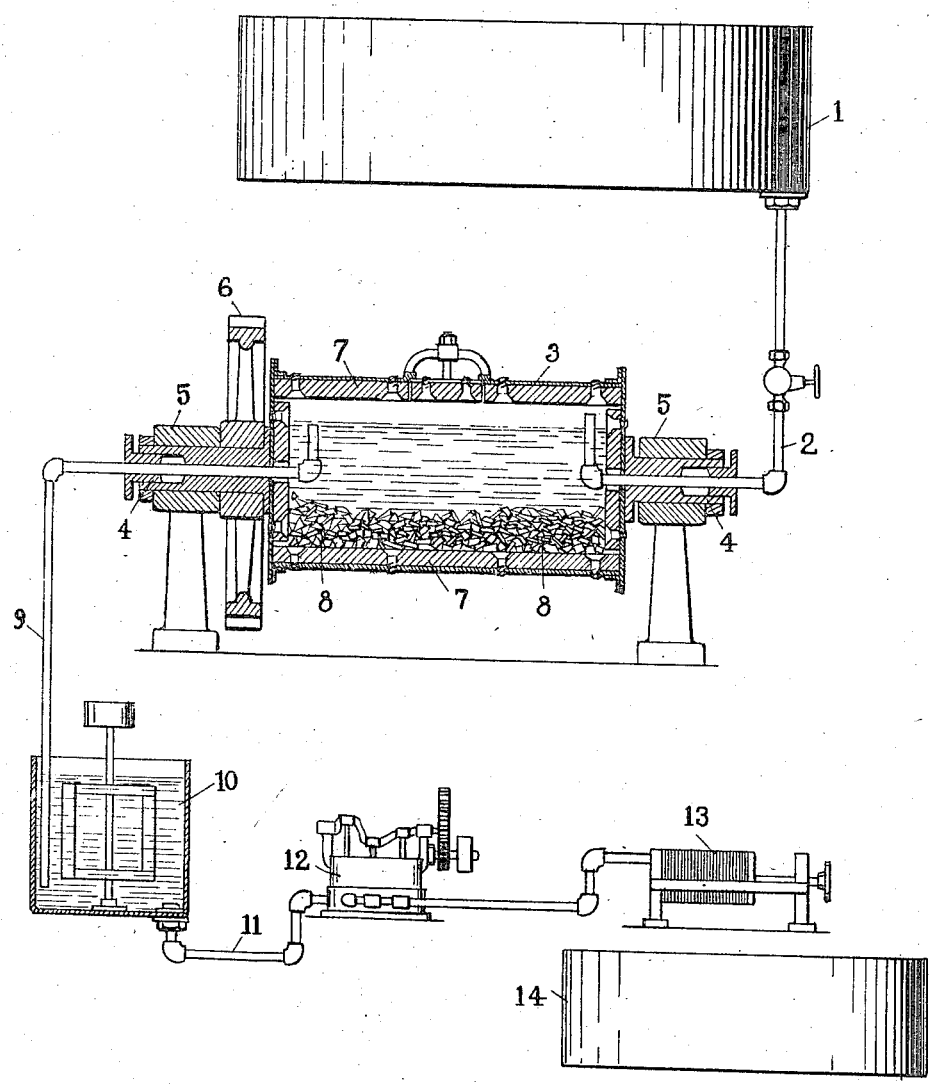
Witnesses:
Samuel W. Balch
Frank C. Cole
Inventor,
Charles Butters,
by Thomas Ewing, Jr.,
Attorney.

UNITED STATES PATENT OFFICE.

CHARLES BUTTERS, OF OAKLAND, CALIFORNIA.

PRECIPITATION OF METALS FROM CYANID SOLUTIONS.

1,092,765. Specification of Letters Patent. Patented Apr. 7, 1914.

Application filed March 31, 1913. Serial No. 757,902.

*To all whom it may concern:*

Be it known that I, CHARLES BUTTERS, a citizen of the United States of America, and a resident of Oakland, Alameda county, State of California, have invented certain new and useful Improvements in the Precipitation of Metals from Cyanid Solutions, of which the following is a specification.

The process to which my invention relates involves the treatment of a cyanid solution containing precious metals, as gold and silver, and by bringing this solution in contact with aluminum effect the precipitation. Heretofore this precipitating metal in order to be effective has been introduced in the form of dust, but the operation of reducing aluminum to dust form has been found to be expensive, while in granulated or solid form the surfaces soon become covered with a deposit which arrests further chemical action.

The object of this invention is to permit the efficient use of aluminum in such granular or solid form, and conduct the process of precipitation cheaply and effectively.

In the accompanying sheet of drawings which forms a part of this application the figure is a diagram in elevation showing the relation of the various parts for carrying out my invention, with the mill shown in section.

The solution of cyanid with the precious metals dissolved therein through contact with the ore and the necessary amount of caustic soda is carried by a tank 1 and led therefrom through a supply pipe 2 to a mill 3. This mill consists of a horizontal inclosed cylinder with trunnions 4 4 supported in bearings 5 5. It is revolved by a gear 6. Through the trunnions at one end the supply pipe passes into the cylinder, and is turned up inside to discharge close to the top. The cylinder is lined with aluminum plates 7 7 and partly filled with granular aluminum 8 8. Both the plates and the granular material being aluminum, serve as the precipitating metal, but it is not essential that the mill be lined with aluminum at the same time that granular aluminum is used, as it has been found that the process can be satisfactorily operated with only the granulations, and this is preferable. The tumbling of the aluminum in the mill continuously subjects the aluminum to attrition and prevents the accumulation on the surface of deposit which would arrest further chemical action.

From the mill an outlet pipe 9 with its mouth near the top of the cylinder passes through the trunnion at the other end from the trunnion through which the supply pipe enters. The outlet pipe discharges the treated solution and suspended fine precipitate into a tank 10 where it is kept agitated until drawn therefrom through a pipe 11 and pump 12 and forced into a precipitation press 13 which retains the precipitate and allows the barren solution to fall into a tank 14.

What I claim as new, and desire to secure by Letters Patent of the United States, is—

1. The process of precipitating precious metals from cyanid solutions which consists in the conduction of the solution through a mill wherein commercial aluminum is contained in the form of granular pieces and continuously subjected to attrition, substantially as described.

2. The process of precipitating precious metals from cyanid solutions which consists in the conduction of the solution through a mill wherein commercial aluminum is contained in the form of granular pieces and as a lining and continuously subjected to attrition, substantially as described.

3. The process of precipitating precious metals from cyanid solutions which consists in the conduction of the solution through a rotating mill wherein commercial aluminum is contained in the form of granular pieces and as a lining and continuously subjected to attrition, substantially as described.

Signed at Oakland, Cal., this 22nd day of March, 1913.

CHARLES BUTTERS.

Witnesses:
ROBERT TURNER,
SCOTT SEATON.